(12) United States Patent
Hu (10) Patent No.: US 7,636,249 B2
(45) Date of Patent: Dec. 22, 2009

(54) RECTIFIER CIRCUIT

(75) Inventor: Jing Hu, Neubiberg (DE)

(73) Assignee: Infineon Technologies Austria AG, Villach (AT)

( * ) Notice: Subject to any disclaimer, the term of this patent is extended or adjusted under 35 U.S.C. 154(b) by 44 days.

(21) Appl. No.: 12/048,099

(22) Filed: Mar. 13, 2008

(65) Prior Publication Data

US 2009/0231895 A1 Sep. 17, 2009

(51) Int. Cl.
*H02M 7/217* (2006.01)
(52) U.S. Cl. .......................... 363/127; 363/89
(58) Field of Classification Search ............. 363/89, 363/125, 127, 21.06, 21.14; 323/274, 284
See application file for complete search history.

(56) References Cited

U.S. PATENT DOCUMENTS

| 4,053,796 | A | * | 10/1977 | Van De Plassche | ......... | 327/104 |
| 6,055,170 | A | | 4/2000 | Yee | | |
| 6,101,104 | A | | 8/2000 | Eng | | |
| 6,418,039 | B2 | | 7/2002 | Lentini et al. | | |
| 6,430,071 | B1 | * | 8/2002 | Haneda | ..................... | 363/127 |
| 7,170,768 | B2 | * | 1/2007 | Heurtier et al. | ............. | 363/127 |

\* cited by examiner

*Primary Examiner*—Jessica Han
(74) *Attorney, Agent, or Firm*—Slater & Matsil, L.L.P.

(57) ABSTRACT

Disclosed is a method for operating a transistor as a rectifier element, and a circuit arrangement including a control circuit and a transistor.

12 Claims, 9 Drawing Sheets

RECTIFIER CIRCUIT

TECHNICAL FIELD

Embodiments of the present invention relate to a rectifier circuit and, in particular, to a rectifier circuit for use in switched mode converters or switched mode power supplies, respectively.

BACKGROUND

A switched mode power supply comprises an input stage for generating an alternating voltage having a varying amplitude and/or frequency from an input voltage, and an output stage for rectifying the alternating voltage and thereby providing a DC voltage to a load. The input stage may comprise a switch that is driven by a pulse width-modulated control signal and that generates a pulse width-modulated alternating voltage. By varying the duty cycle of the control signal voltage regulation of the output voltage can be achieved.

Instead of using a diode rectifier a so-called "synchronous" rectifier (SR) can be used in the output stage. The synchronous rectifier comprises a transistor, e.g., a MOSFET, in particular a power MOSFET, and a control circuit for switching the transistor on and off in a way as to allow a current to flow through the transistor in only one direction. As compared to a diode a MOSFET that is in on state has lower power losses, thus resulting in an increased efficiency of the rectifier circuit.

A power MOSFET has a MOS channel that conducts dependent on a control signal applied to the MOSFET's gate terminal, and has an integrated body diode that conducts, independent of the control signal, when the MOSFET is reverse biased. In conventional switched mode power supplies that comprise a MOSET as a rectifier element the MOSFET is connected such that it is reverse biased in those time periods in which it is expected to conduct for rectifying purposes. In transition periods, i.e., when the transistor is in transition between the forward biased and the reverse biased operating state, and when the MOS channel is not yet conducting the body diode takes over the current through the MOSFET. In general the duration of the time periods when the body diode conducts should be as short as possible in order to minimize power losses.

Switched mode power supplies can be operated in so-called discontinuous current mode (DCM). In DCM there is a time period in each switching cycle of operation when the current through the rectifier circuit is zero before the begin of a following switching cycle. In DCM switched mode power supplies that comprise a synchronous rectifier it is desired to switch the rectifier transistor off when the current through the transistor reaches zero (zero current switching). This requires measuring the current through the transistor, where such current measurement can be performed by measuring a voltage across the transistor. However, when the current approaches zero the voltage also approaches zero, which complicates the voltage measurement during those time periods that are of particular interest. Further, propagation delays in the transistor control circuit make zero current switching difficult. If there is a delay between a time when the transistor control signal assumes a switch-off level and the time when the transistor really switches off, then the switch-off level has to be generated before the current reaches zero, i.e., the switch-off level has to be generated when the current (or the measurement voltage) falls below a switch-off threshold larger than zero. Since propagation delays may be dependent on the temperature adjusting the switch-off threshold is difficult.

SUMMARY OF THE INVENTION

An example of a method for operating a transistor as a rectifier element, in which the transistor can assume one of a forward biased and a reverse biased state, and in which the transistor is controlled using a control signal that can assume a switch-on level and a switch-off level, comprising: generating a switch-on level of the control signal prior to the transistor entering the reverse biased state, or after the transistor has entered the reverse biased state; in the reverse biased state, measuring a reverse biasing voltage of the transistor for providing a first measurement signal; comparing the reverse biasing voltage to a first reference value, and generating a switch-off level of the control signal after a delay period after the reverse biasing voltage has reached the first reference value; after the reverse biasing voltage has reached the first reference value, generating a delay period for a next cycle of operation depending on values of the reverse biasing voltage occurring within an evaluation time window.

BRIEF DESCRIPTION OF THE DRAWINGS

Embodiments of the present invention can be better understood with reference to the following drawings and the description. The components in the figures are not necessarily to scale, emphasis instead being placed upon illustrating the principles of the invention. Therefore, only signals and components necessary for illustrating the principles are shown. Moreover, in the figures, like reference numerals designate corresponding parts throughout the different figures.

DETAILED DESCRIPTION OF ILLUSTRATIVE EMBODIMENTS

Figure 1:
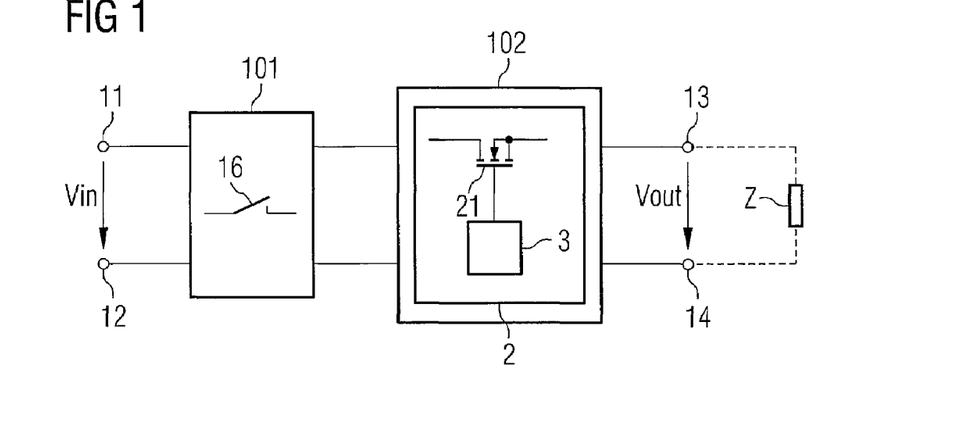
FIG. 1 schematically illustrates a block diagram of a switched mode power supply having an input stage and an output stage comprising a synchronous rectifier.

FIG. 1 shows a block diagram of a switch mode converter that includes input terminals 11, 12 for applying an input voltage Vin, output terminals 13, 14 for providing an output voltage Vout and for connecting a load Z thereto. The converter further includes an input stage that is connected to the input terminals 11, 12, and that includes at least a switch 16 for generating an alternating voltage, e.g. a square-wave voltage, from the input voltage Vin. An output stage 102 is electrically and/or magnetically coupled to the input stage 101 and provides the output voltage Vout at the output terminals 13, 14. The output stage 102 comprises a rectifier circuit for rectifying the alternating voltage provided by the input stage 101. The rectifier circuit comprises a transistor 21 and a control circuit 3 for controlling the transistor 21.

The switch mode converter may have any conventional converter topology including, but not limited to, a buck converter topology, a boost converter topology, a one- or two-switch forward converter topology, a half-bridge or full-bridge converter topology, a push-pull converter topology or fly-back converter topology. Common to all of these different converter topologies is an output stage that comprises at least one rectifier circuit.

Figure 2:
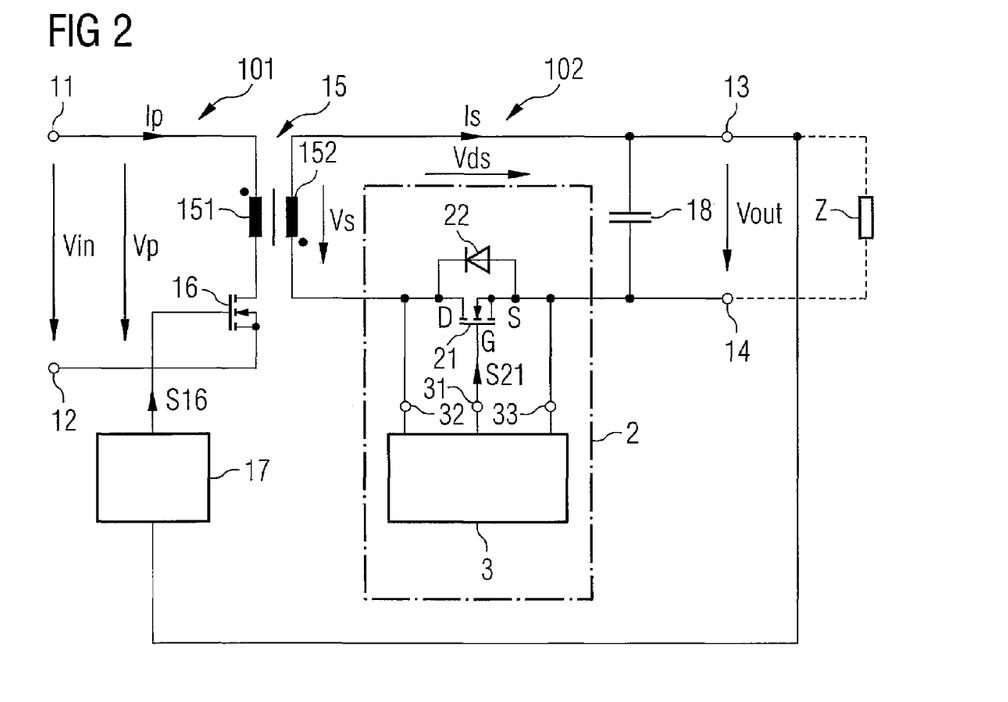
FIG. 2 shows a circuit diagram illustrating a switched mode converter comprising a synchronous rectifier, with the synchronous rectifier comprising a transistor and a control circuit for the transistor.

By way of example only, FIG. 2 illustrates a switch-mode power supply having a fly-back converter topology. The input stage 101 of this converter includes a primary winding 151 of a transformer 15 and the switch 16 where the switch 16 is connected in series to the primary winding 151, and where a series circuit that comprises the primary winding 151 and the switch 16 is connected between the input terminals 11, 12. Switch 16, that, for example, is a MOSFET, is controlled by a control circuit 17 that generates a control signal S16 for switching the switch 16 on or off. The control signal is generated dependent on the output voltage Vout, thereby allowing voltage regulation of the output voltage Vout. The control signal S16 may be a pulse width modulated (PWM) signal that has a varying duty cycle for voltage regulation purposes. The duty cycle, for example, increases, if the power consumption of the load Z increases, and the duty cycle decreases, if the power consumption of the load Z decreases, in order to keep the output voltage Vout constant independent of the power consumption of the load. Control circuits for generating PWM control signals for controlling a switch in a fly-back converter are known. Therefore, no further explanations is required in this regard.

The output stage 102 of the fly-back converter in FIG. 2 comprises a secondary winding 152 of the transformer 15 that is magnetically coupled to the primary winding 151. The output stage 102 further comprises the rectifier circuit 2 which is connected to the secondary winding 152, and an output capacitor 18. In the example the rectifier circuit 2 and the output capacitor 18 form a series circuit that is connected in parallel to the secondary winding 152.

The rectifier circuit 2 comprises a transistor 21 and a rectifier control circuit 3 for controlling transistor 21. Transistor 21 includes a load path D-S that is connected in series to the secondary winding 152, and a control terminal for receiving a control signal S21. Control signal S21 is generated by rectifier control circuit 3 dependent on a voltage Vds across the load path of the transistor 21. The rectifier control circuit 3 in FIG. 2 has at least three terminals, an output terminal 31 for providing the control signal S21, and first and second input terminals 32, 33 for sensing the voltage Vds across the load path of transistor 21. A rectifier functionality of transistor 21 is obtained by controlling transistor 21 in such a way that it is switched on for load voltages Vds having a first sign, and that is switched off for load voltages Vds having a second sign that is complementary to the first sign. In this way a current is allowed to flow through transistor 21 in only one direction. For protection purposes a diode 22 is connected in parallel to the load path of transistor 21. Diode 22 may take a current in periods in which transistor 21 is not (yet) switched on.

Transistor 21 can be a MOS transistor, in particular a MOSFET. By way of example, transistor 21 in FIG. 2 is a MOSFET and will be referenced to as synchronous rectifier (SR) MOSFET in the following. Drain and source terminals DS of the MOSFET form load terminals for connecting the MOSFET in series to the secondary winding 152, and a gate terminal G forms a control terminal for receiving control signals S21.

SR MOSFET 21 can be a power MOSFET. Power MOSFETs comprise an integrated body diode that is connected between drain D and source terminal S. When using a power MOSFET as SR MOSFET no additional diode that is connected in parallel to the transistor's load path is required.

SR MOSFET 21 may assume one of a forward biased state, and a reverse biased state. For purpose of further explanation it is assumed that SR MOSFET 21 is in reverse biased state if body diode 22 is forward biased, i.e., if body diode 22 conducts a current, and that SR MOSFET 21 is in forward biased state if body diode 22 blocks.

By way of example, the SR MOSFET 21 in FIG. 2 is a n-channel MOSFET that is forward biased for positive drain-source voltages Vds, and that is reversed biased for negative drain-source voltages Vds. In this MOSFET an anode terminal of body diode 22 is connected to source, while a cathode terminal is connected to drain. In the fly-back converter of FIG. 2 SR MOSFET 21 is expected to be switched on for a positive secondary voltage Vs, while it is expected to be switched off for negative secondary voltages Vs. In this way a secondary current Is is allowed to flow in one direction, only, for charging output capacitor 18 and/or supplying the load Z. In the example of FIG. 2 SR MOSFET 21 is, therefore, expected to be switched on in reverse biased operating state and is expected to be switched off in forward biased operating state. If SR MOSFET 21 is switched on in reverse biased operating state, secondary current Is flows through a MOS channel inside MOSFET 21, instead of the body diode 22. The conduction voltage of switched on MOSFET 21 is lower than conduction voltage of forward biased body diode 22. Switching on SR MOSFET 21 in reversed biased state therefore reduces power losses in the rectifier circuit 2.

Figure 3:
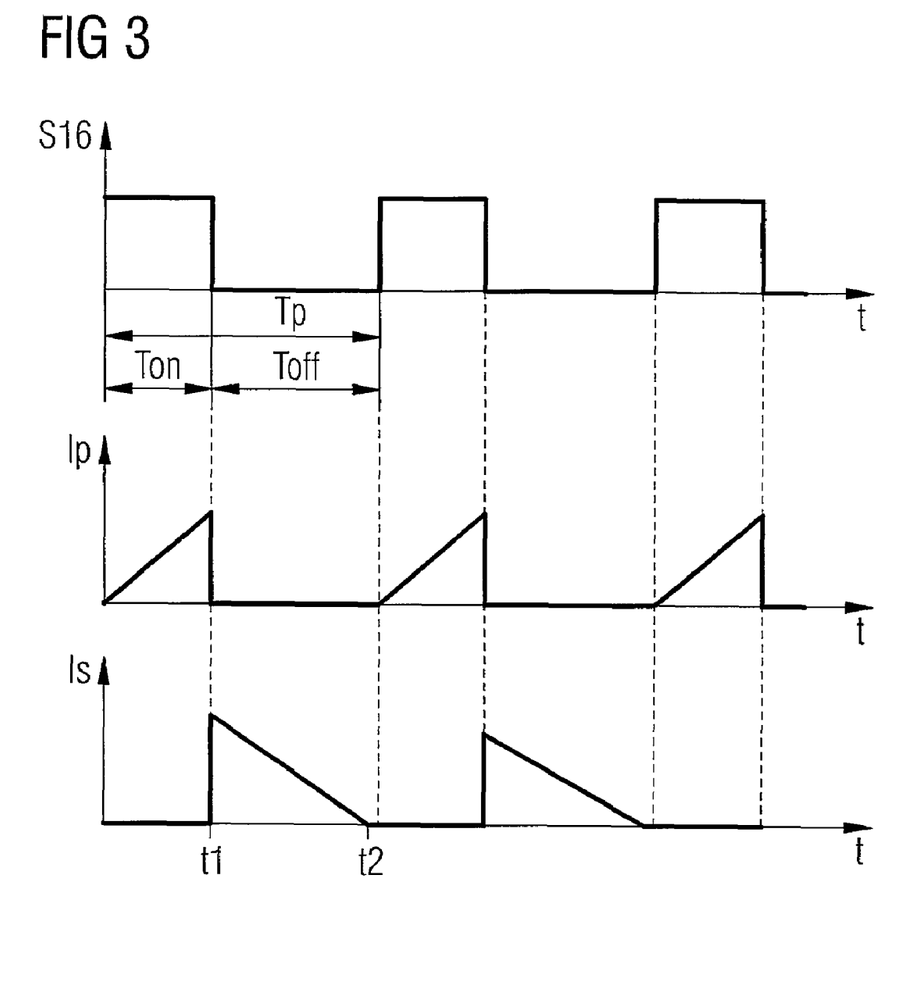
FIG. 3 schematically illustrates the waveforms of selected signals occurring in the converter for illustrating the functionality of the converter.

FIG. 3 illustrates a general operation principle of the fly-back converter in FIG. 2. FIG. 3 shows exemplary waveforms of the control signal S16 that controls switch 16 in the input stage, of a primary current Ip that flows in the input stage 101, and of the secondary current Is. The converter according to FIG. 2 may be operated in so-called continuous current mode (CCM) or in discontinued current mode (DCM). FIG. 3 shows the waveforms for discontinuous current mode in which the secondary current Is is allowed to decrease to zero before a following switching cycle starts.

The converter has repeating operating cycles, where in each cycle primary switch 16 is switched on for an on-period, and is, subsequently, switched off for an off-period. The relationship between the duration of the on-period and the overall duration of one cycle defines the duty cycle of the converter. During the on-period, that is represented by a high-level of control signal S16 in FIG. 3, a primary voltage (i.e., the voltage across primary winding 151) is positive and the primary current Ip increases. During this on-period secondary voltage Vs is negative, SR MOSFET 21 is, therefore, forward biased, and is expected to be switched off. Secondary current Is is, therefore, zero. During the off-period primary current Ip is zero, and secondary voltage Vs turns positive. In this case SR MOSFET 21 is reverse biased, and is expected to be switched on. During the off-period secondary current Is that flows through rectifier circuit 2 decreases from an upper current value, that is present immediately after switching primary switch 16 off to zero.

In order to minimize power losses in the output stage 102, SR MOSFET 21 should be switched on immediately after secondary voltage Vs turns positive, and should stay switched on as long as SR MOSFET 21 is reversed biased and a secondary current Is flows. SR MOSFET 21 should not be switched on in forward biased operating state, otherwise, output capacitor 18 would be discharged, thereby increasing the overall power losses of the converter. In order to obtain proper switching of SR MOSFET 21 SR control circuit 3 is adapted to measure the voltage across the load path of SR MOSFET 21. Voltage measurement is required for detecting reverse biased operation of SR MOSFET 21, and to, therefore, ensure proper switching.

Figure 4:
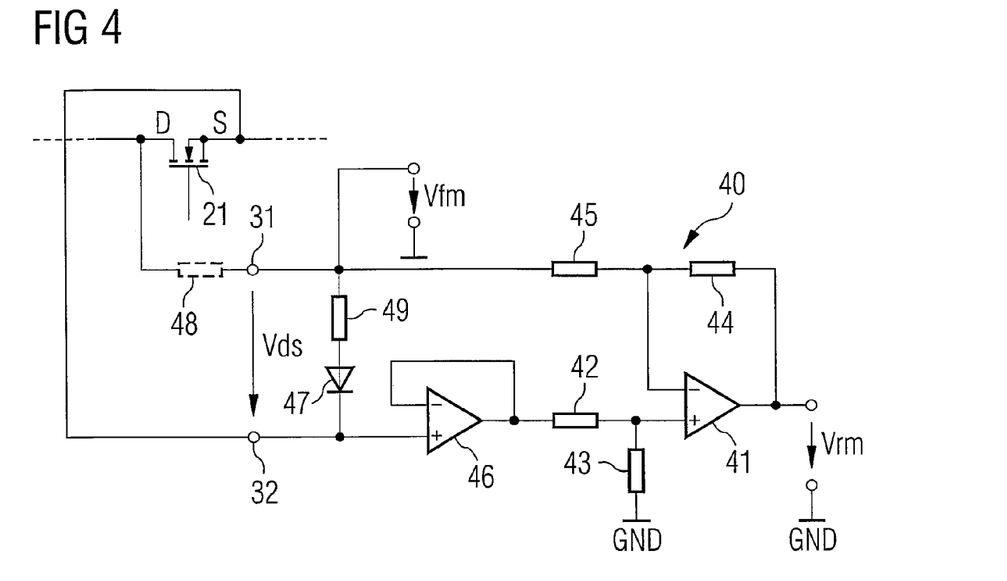
FIG. 4 illustrates an example of a measurement circuit included in the control circuit.

FIG. 4 illustrates an example of a voltage measurement circuit that may be implemented in SR control circuit 3. Voltage measurement circuit 40 comprises an inverting amplifier that, in the example, includes a differential amplifier 41, and first and second resistors 44, 45. A first one 44 of the resistors is connected between an output and an inverting input of the differential amplifier 41; a second one 45 of the resistors is connected to the inverting input of the differential amplifier 41. The amplifying factor of the inverting amplifier can be adjusted by setting the ratio of the resistances of the two resistors 44, 45. The inverting amplifier 41, 44, 45 provides a first measurement signal Vrm that is present at the output of differential amplifier 41. First measurement signal Vrm in the example is a voltage that is referred to an internal reference potential. Such internal reference potential is ground, for example. The absolute value of first measurement signal Vrm is dependent on a voltage across the load path of SR MOSFET 21 when SR MOSFET 21 is reverse biased. In other words, first measurement signal Vrm is indicative of a reverse voltage of SR MOSFET 21, where a reverse voltage is a negative drain-source-voltage in the exemplary rectifier circuit 3 in FIG. 2.

For providing the first measurement signal, i.e., for measuring the reverse voltage, an inverting input of the differential amplifier 41, via the second resistor and via first input terminal 31 of SR control circuit 3, is coupled to the drain terminal D of SR MOSFET 21. A non-inverting input of differential amplifier 41 is connected to the source terminal of SR MOSFET 21 via the second input terminal 32 of SR control circuit 3. Optionally, a voltage follower 46 is connected between the second input terminal 32 and the non-inverting input of differential amplifier 41. The voltage follower 46 may be a further differential amplifier that has its non-inverting input connected to the second input terminal 32, and that has its output terminal connected to its inverting input terminal.

The voltage measurement circuit 40 further comprises a voltage divider 42, 43 that is connected between the source terminal of SR MOSFET 21 and a terminal for the internal reference potential GND, and that has an output terminal that is connected to the non-inverting input terminal of differential amplifier 41. Voltage divider 42, 43 divides a voltage which is referred to the internal reference potential, and which is dependent on the electrical potential at the source terminal of SR MOSFET 21.

The first measurement signal Vrm provided by the circuit 40 in FIG. 4 is not equal to zero only for negative drain-source-voltage, i.e., only for voltages for which SR MOSFET 21 reversed biased, and is zero for positive drain-source-voltage, i.e., for voltages for which SR MOSFET 21 is forward biased, as from the circuit shown in FIG. 4. In another implementation the non-inverting pin of the voltage follower 46 may be connected to a non-zero voltage to achieve an offset of the measured voltage Vrm for an easy evaluation.

The voltage measurement circuit 40 in FIG. 4 further provides a second voltage measurement signal Vfm which corresponds to the voltage across SR MOSFET 21. However, for forward voltages (positive drain-source-voltages) second voltage measurement signal Vfm is limited to a maximum threshold. For providing the second voltage measurement signal Vfm a rectifier element 47, e.g., a diode, is connected between the first and second input terminal 31, 32. Second voltage measurement signal Vfm corresponds to the voltage between the first and second input terminals 31, 32. Rectifier element 47 is connected such, that it blocks for reverse voltages and conducts for forward voltages. For reverse voltages the second voltage measurement signal Vfm therefore corresponds to the reverse voltage. For forward voltages that are lower than the forward voltage of diode 47 the second voltage measurement signal Vfm corresponds to the forward voltage, and for forward voltages that are higher than the forward voltage of diode 47 the second voltage measurement signal Vfm corresponds to (is limited to) the forward voltage of diode 47. To limit the voltage appearing at the terminal 31, a resistor 48 may be connected between the terminal 31 and drain of the SR MOSFET.

Optionally, a further resistor 49 may be connected in series to diode 47. Such resistor helps to increase the second voltage measurement signal Vfm to values higher than the conduction voltage of diode 47 when SR MOSFET 21 is forward biased.

The measuring circuit provides the first voltage measurement signal Vrm by amplifying reverse voltages, which may be in the range of several mV. The second voltage measurement signal Vfm corresponds to the voltage across SR MOSFET for reverse voltages and for low forward voltages, and for high forward voltages is limited to value that is determined by diode 47 and the optional resistor 49. Forward voltages, depending on the particular application, may be in the range of several ten to several hundred volts. By limiting the forward voltage using diode 47 and the optional resistor 48 usual logic circuits for processing the first and second voltage measurement signals Vrm, Vfm may be used. Thus, no high voltage components for evaluating these voltage measurement signals Vrm, Vfm are required.

Figure 5:
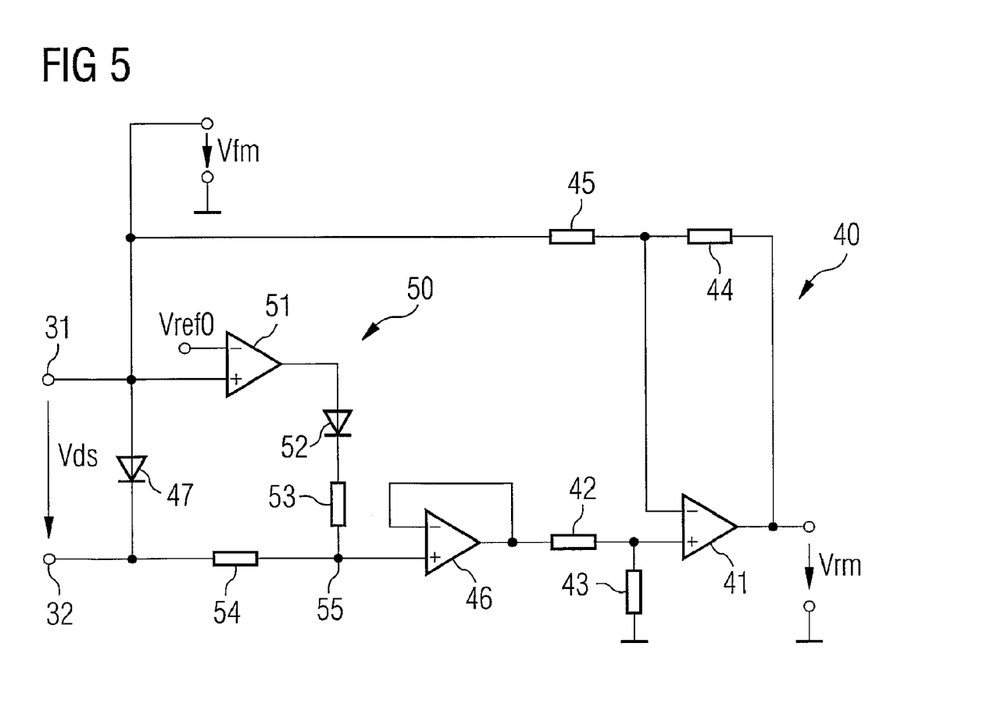
FIG. 5 illustrates a further example of a measurement circuit that is included in the control circuit and that includes anti-saturation means.

FIG. 5 illustrates a voltage measurement circuit 40 which is different from the measurement circuit 40 in FIG. 4 in that it comprises an active anti-saturation circuit 50. Anti-saturation circuit 50 enables a fast response of the first voltage measurement signal Vrm to changes of the voltage across SR MOSFET 21, and avoids or at least reduces voltage overshoots.

Anti-saturation circuit 50 comprises a comparator 51 having a non-inverting input connected to the first input 31 of SR control circuit, and an inverting input receiving a reference potential Vref0. Reference potential Vref0 is selected to be lower than the forward voltage of diode 47. For forward voltages of SR MOSFET 21 higher than the forward voltage of diode 47 comparator 51 provides a high signal level at its output. Connected to the output of comparator 51 is a series circuit comprising a further diode 52 and first and second resistors 53, 54, with this series circuit being connected between the output of comparator 51 and the second input terminal 32 of SR control circuit. A circuit note 55 between first and second resistors 53, 54 is coupled to the non-inverting input of differential amplifier 41. When SR MOSFET 21 is forward biased a reference voltage is available at circuit note 55 which is slightly higher than the forward voltage of diode 47. In this way, differential amplifier 41 is kept active since its non-inverting input terminal has a slightly higher potential than its inverting input terminal. When the forward voltage of SR MOSFET 21 falls below the forward voltage of diode 47, which is the case when SR MOSFET 21 changes from forward biased operating state to reverse biased operating state, then the voltage across diode 47 falls below the reference voltage Vref0, causing the output level of comparator 51 to go low. The voltage at circuit node 55 in this case approaches zero and hence has no influence on the inverting amplifier 41, 44, 45 that provides the first measurement signal Vrm. In other words, anti-saturation circuit 50 provides a voltage to keep the inverting amplifier 41, 44, 45 in active region during forward biased SR MOSFET, while there is no impact on the inverting amplifier to amplify the reverse voltage across the drain and source terminal, i.e., to provide the first measurement signal Vrm.

It should be mentioned that the voltage follower 46 and the voltage divider 42, 43 in the circuits of FIGS. 4 and 5 are optional and may be omitted. In this case only the inverting amplifier 41, 44, 45 (FIG. 4), or the inverting amplifier 41, 44, 45 and the anti-saturation circuit 50 (FIG. 5) are used to measure the SR MOSFET's reverse voltage.

Figure 6:
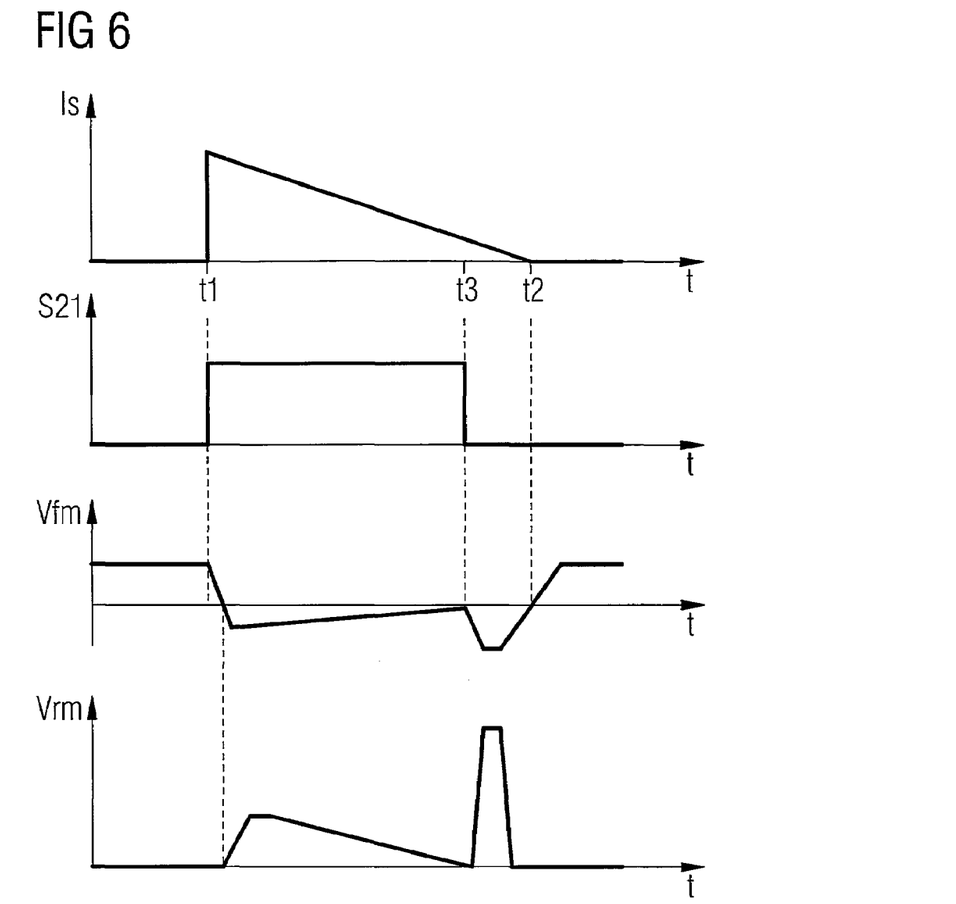
FIG. 6 illustrates waveforms of signals provided by the measurement circuit of FIG. 5.

FIG. 6 illustrates timing diagrams of the first measurement signal Vrm, the secondary current Is, the control signal S21 and the second measurement signal Vfm that corresponds to voltage Vds across the load path of transistor 21 in reverse biased state. In the timing diagrams t1 is a time when a secondary current starts to flow through SR MOSFET 21. Referring to the example in FIG. 2 t1 may be the time, when switch 16 that is connected in series to the primary winding of transformer 15 is switched off. t2 is the time, when the secondary current Is has decreased to zero. For explanation purposes it may be assumed that SR MOSFET 21 is switched on at time t1. In FIG. 6 a high signal level of control signal S21 represents an on state and a low-signal level of control signal S21 represents an off state of SR MOSFET 21. For explanation purposes it may further be assumed that SR MOSFET 21 is switched off before the secondary current has decreased to zero. In FIG. 6 time t3 that is between times t1 and t2 is the time when SR MOSFET 21 is switched off.

In the scenario that is illustrated in FIG. 6 there are two different phases of operation of SR MOSFET 21 between times t1 and t2. In a first phase which is between times t1 t3 SR MOSFET is switched on, the secondary current, therefore, flows through the MOS channel inside SR MOSFET 21. In a second phase which is between times t3 and t3 SR MOSFET is switched off. At this time the secondary current Is has not yet decreased to zero. In this second phase the secondary current flows through the body diode 22 of SR MOSFET 21. Because of the higher on resistance of the body diode as compared to the on resistance of the MOS channel the load path voltage Vds, and consequently the first measurement signal Vrm, increases after the SR MOSFET 21 has been switched off until the secondary current Is decreases to zero.

Figure 7:
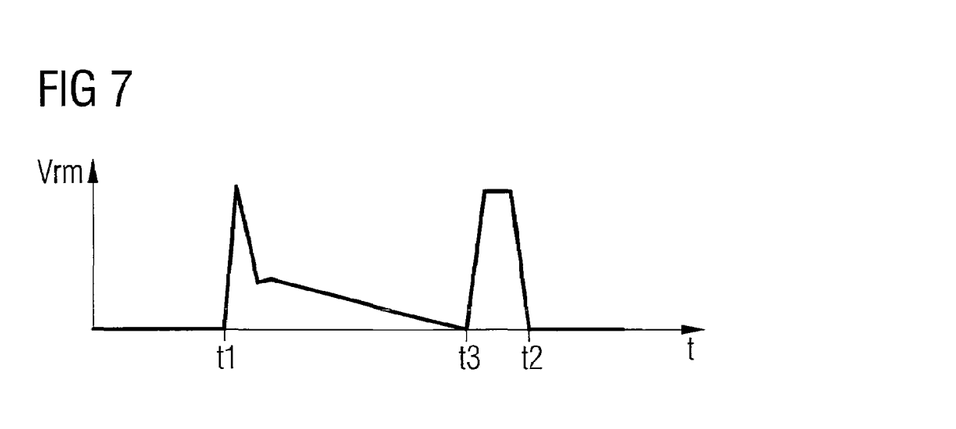
FIG. 7 illustrates the waveform of one of the signals provided by the measurement circuit of FIG. 4.

FIG. 6 illustrates the timing diagram of the first measurement signal Vrm that is obtained by a measurement circuit as shown in FIG. 5. In this measurement signal Vrm voltage overshoots that may occur at the time when secondary current IS starts to flow, i.e., when SR MOSFET turns from its forward biased state into its reverse biased state, are prevented. For comparison FIG. 7 illustrates the timing diagram of the first measurement signal Vrm that is obtained by a measurement circuit as shown in FIG. 4. Since this measurement circuit does not comprise means for preventing current overshoots such overshoots occur at the time when secondary current IS starts to flow. However, the measurement signals that are obtained by the two different measurement circuits only differ during a short period of time after the secondary current starts to flow and are identical in the remaining time until the secondary current decreases to zero.

Figure 8:
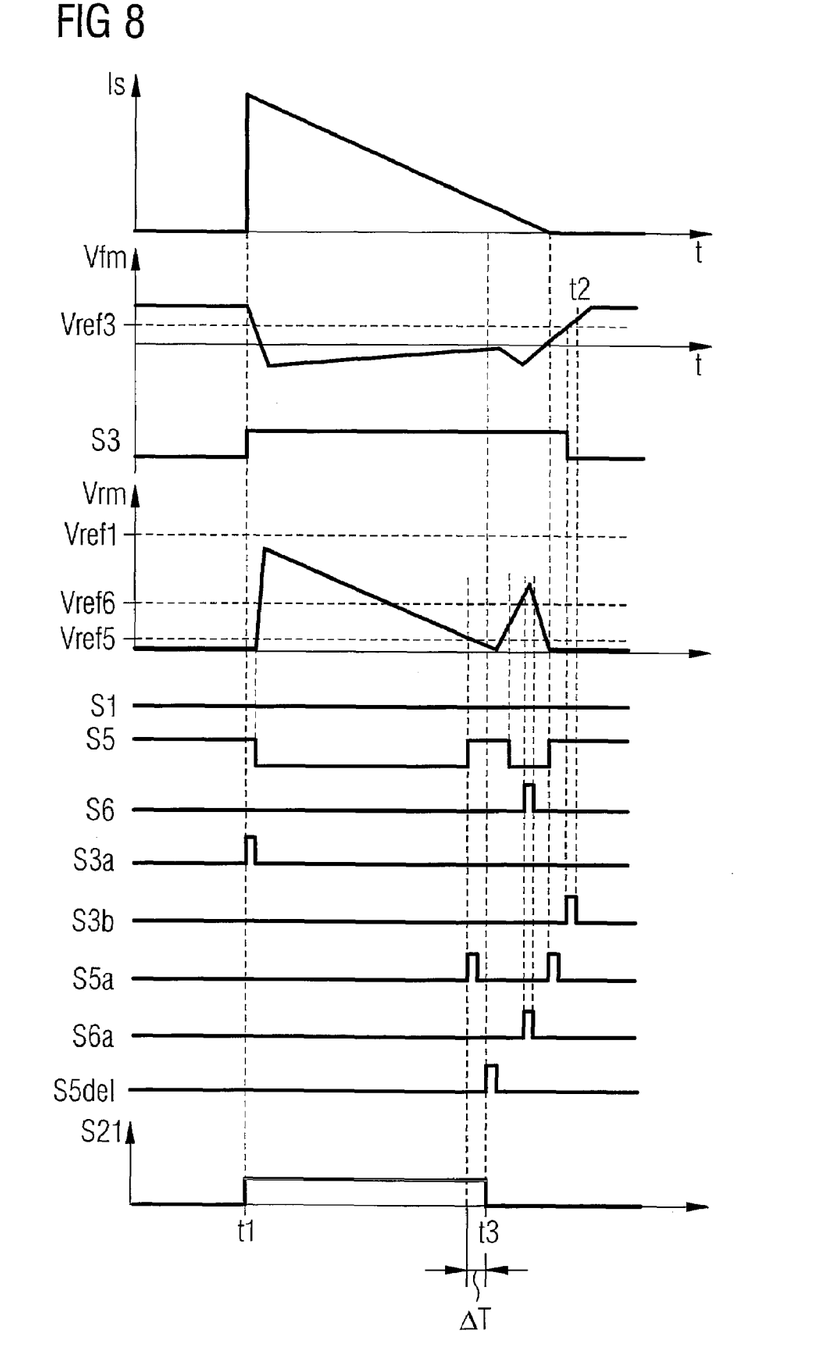
FIG. 8 illustrates a scenario, when a transistor of a synchronous rectifier is switched off in an optimum manner.

An example of a method for achieving proper switching of SR MOSFET 21 will now be explained with reference to FIG. 8 in which inter alia timing diagrams of the first and second measurement signals Vrm, Vfm, and of the control signal S21 are shown. In this method SR MOSFET 21 is switched on at the time when the second measurement signal Vfm falls below a given threshold Vref3, which will be referred to as on-threshold in the following. In FIG. 8 t1 denotes the time when SR MOSFET 21 is switched on. For switching SR MOSFET 21 off the first measurement signal is evaluated, where in the present example SR MOSFET 21 is switched off after a delay time $\Delta T$ after the first measurement signal has reached a threshold Vref5, which will be referred to as off-threshold in the following.

Figure 9:
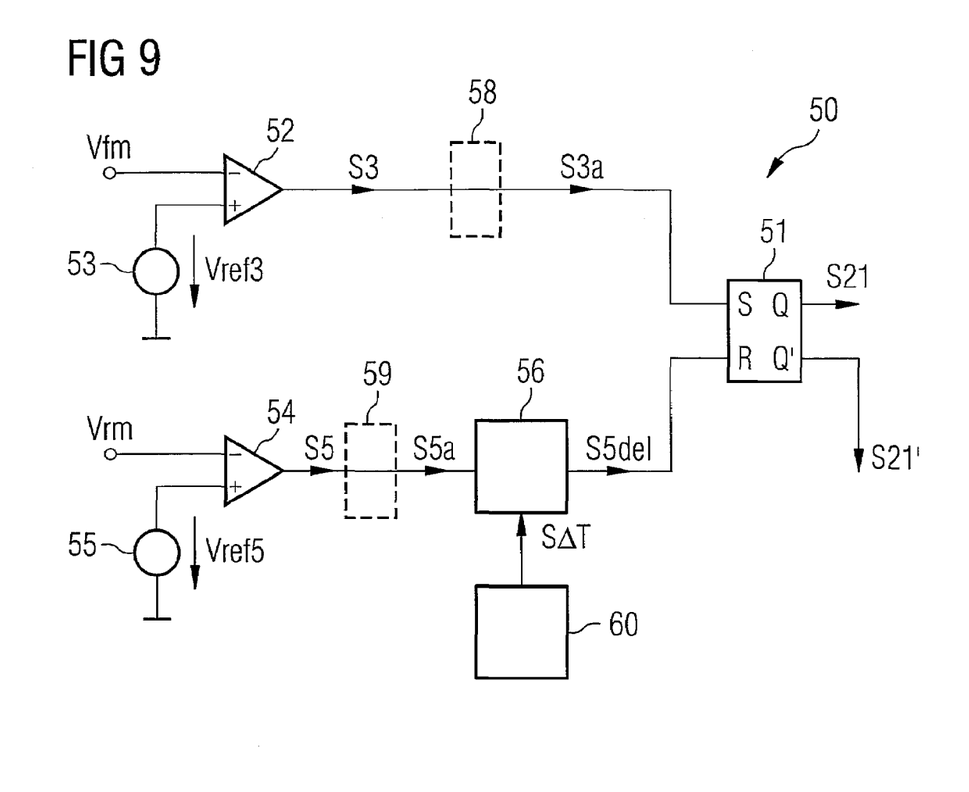
FIG. 9 illustrates an example of the control circuit that includes a timer that receives a delay time signal.

FIG. 9 illustrates an example of a drive circuit 50 that is adapted to generate the control signal S21 dependent on the first and second measurement signals Vrm, Vfm. Such drive circuit 50 is part of the control circuit (see reference number 3 in FIG. 2). The drive circuit 50 includes a flip-flop, which is an RS flip-flop in the example, that provides the control signal S21 at its non-inverting output Q. Control signal S21 has a high-signal level that switches SR MOSFET 21 on, if flip-flop 51 is set, and has a low-signal level that switches SR MOSFET 21 off, if flip-flop 51 is reset. Flip-flop 51 is set dependent on a comparison between second measurement signal Vfm and on-threshold value Vref3, where the on-threshold Vref3 is provided by a reference voltage source 53 in the circuit of FIG. 9. A first comparator 52 compares the second measurement signal Vfm and the on-threshold value Vref3 and provides a set signal S3 at its output. In the present example set signal S3 assumes a high-signal level each time on-threshold value Vref3 is higher than the second measurement signal Vfm, i.e., each time the second measurement signal Vfm falls below the on-threshold Vref3. Flip-flop 51 is adapted to be set with each rising edge of set signal S3.

Flip-flop 51 is a reset dependent on a comparison between the first measurement signal Vrm and off-threshold value Vref5, where off-threshold value is provided by a second reference voltage source 55 in the circuit of FIG. 9. A second comparator 54 compares the first measurement signal Vrm to the off-threshold Vref5 and provides a reset signal S5 at its output. In the present example reset signal S5 assumes a high signal level each time the first measurement signal Vrm falls below the off-threshold value Vref5.

For obtaining a delay time between the time when the first measurement signal Vrm falls below the off-threshold Vref5 and the time when flip-flop 51 is reset to switch SR MOSFET 21 off a timer 56 is connected between the output of the second comparator 54 and the reset input R of flip-flop 51. Timer 56 is adapted to generate a delayed reset signal S5*del* for resetting flip-flop 51 after the delay time $\Delta T$ after a rising edge of reset signal S5 has occurred. Timing diagrams of set signal S3, reset signal S5 and delayed reset signal S5*del* are also shown in FIG. 8.

Figure 10:
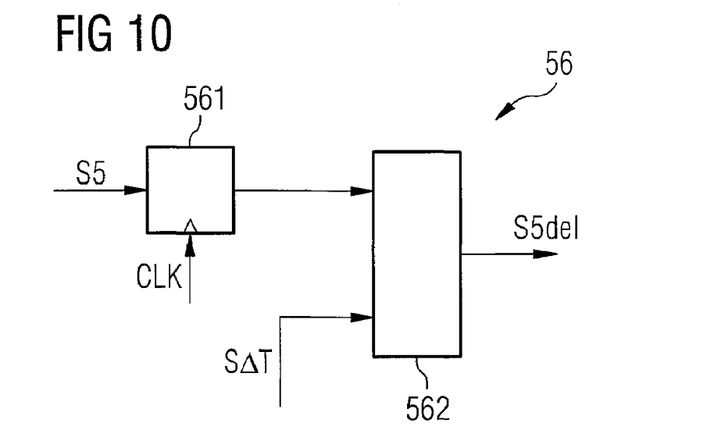
FIG. 10 illustrates an example of the timer.

It should be mentioned that flip-flop 51 may be a positive edge-triggered flip-flop that is set with a rising edge of set signal S3 and that is reset with a rising edge of delayed reset signal S5*del*. Instead of directly feeding set signal S3 and reset signal S5 to flip-flop 51 and timer 56, respectively, pulse generation circuits 58, 59 may be connected upstream the set input S of flip-flop 51 and upstream of timer 56. First pulse generation circuit 58 is adapted to generate a signal pulse each time a rising edge of set signal S3 occurs. Second pulse generation circuit 59 generates a signal pulse each time a rising edge of reset signal S5 occurs. S3a and S5a denote the output signals of these pulse generation circuits 58, 59. Timing diagrams of these (optional) signals are also illustrated in FIG. 8. The advantage of using signal pulses for setting and resetting flip-flop 51, instead of using rising edges of the signals is that in some cases pulse triggered flip-flops may be easier to implement The delay time ΔT that is introduced by timer 56 is variable and is dependent on a delay time signal $S_{ΔT}$ that is generated by a delay time generation circuit 60. Timer 56 may be realized as a digital timer and may comprise a counter that starts counting with a rising edge of reset signal S5 (or a signal pulse of pulse signal S5a). The comparator compares the current counter value to the delay time signal $S_{ΔT}$ and generates a signal pulse for resetting flip-flop 51 each time the counter value equals the delay time signal $S_{ΔT}$. An example of such timer circuit 56 is shown in FIG. 10. In this Figure reference number 561 denotes the counter, and 562 denotes the comparator. The comparator 562 may comprise a buffer for storing the delay time signal $S_{ΔT}$ it receives from delay time generation circuit (60 in FIG. 9). Alternatively or additionally such buffer may be included in the delay time generation circuit. CLK denotes a clock signal that is received by counter 561. In this example counter 561 is incremented with each clock cycle of clock signal CLK.

Alternatively to using a counter that is incremented with each clock cycle of clock signal CLK a counter may be used that is set to the value of the delay time signal $S_{ΔT}$ with each rising edge of reset signal S5 (or with each signal pulse of pulse signal S5a) and that is decremented with each clock cycle of clock signal CLK. In this case a reset pulse for resetting flip-flop 51 is generated each time the counter value reaches zero.

For adjusting the delay time ΔT the first measurement signal Vrm is evaluated each time after SR MOSFET 21 has been switched off, i.e., each time after control signal S21 assumes a low-signal level. Adjusting the delay time ΔT may be necessary in order to obtain optimum switching of SR MOSFET 21. In a method according to the example an optimum switching scenario of SR MOSFET 21 has been reached if first measurement signal Vrm stays below an upper threshold Vref1 but rises above a lower threshold Vref6 after SR MOSFET 21 has been switched off. Lower threshold Vref6 is higher than off-threshold Vref5 but is lower than upper threshold Vref1 where the upper threshold vref1 may correspond to the lowest forward conduction voltage of the SR MOSFET 21 body diode. After SR MOSFET 21 has been switched off the first measurement signal Vrm only rises above the lower threshold Vref6, if the secondary current (reverse current) Is has not yet decreased to zero at the time when SR MOSFET 21 is switched off. However, if, additionally, the first measurement signal Vrm stays below the upper threshold Vref1 after SR MOSFET has been switched off the reverse current Is at the time of switching SR MOSFET 21 off has been low enough in order to obtain low-conduction losses.

Figure 11:
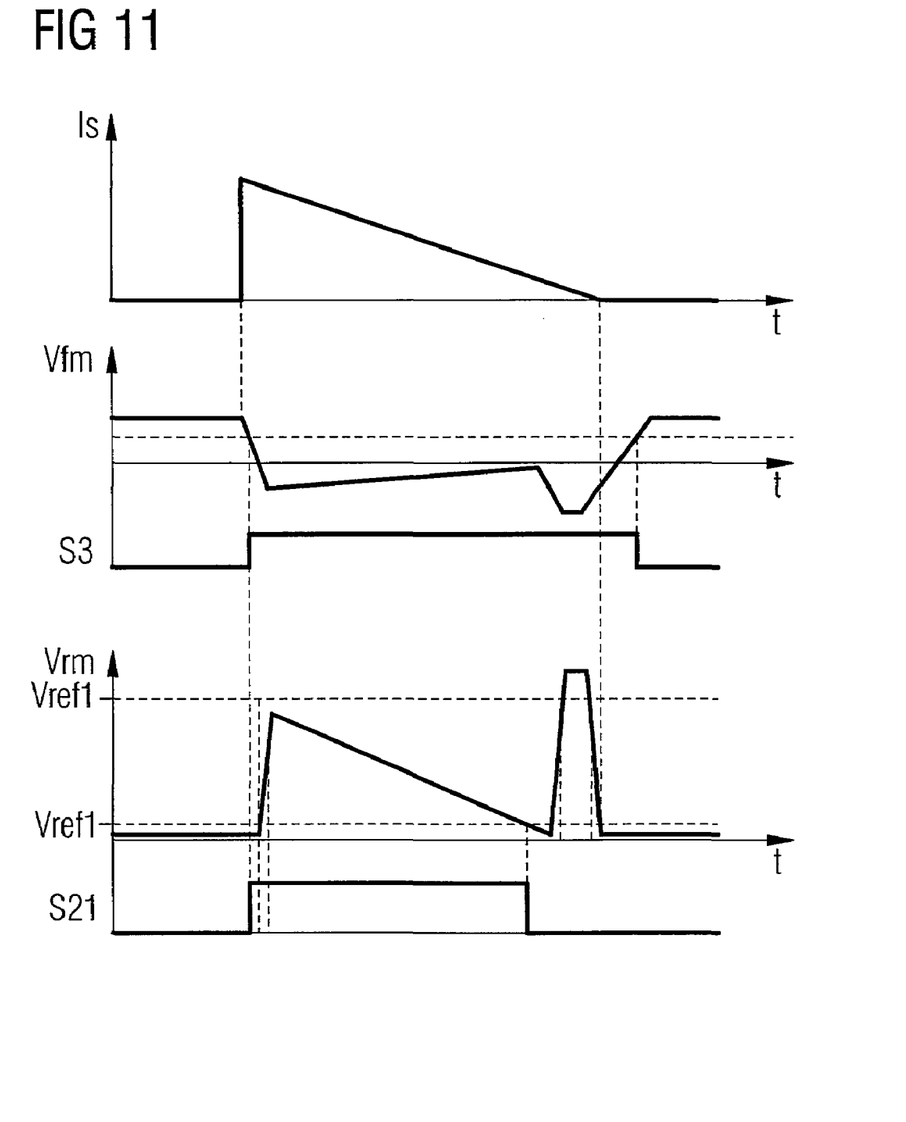
FIG. 11 illustrates a scenario, when a transistor of a synchronous rectifier is switched off too early.
Figure 12:
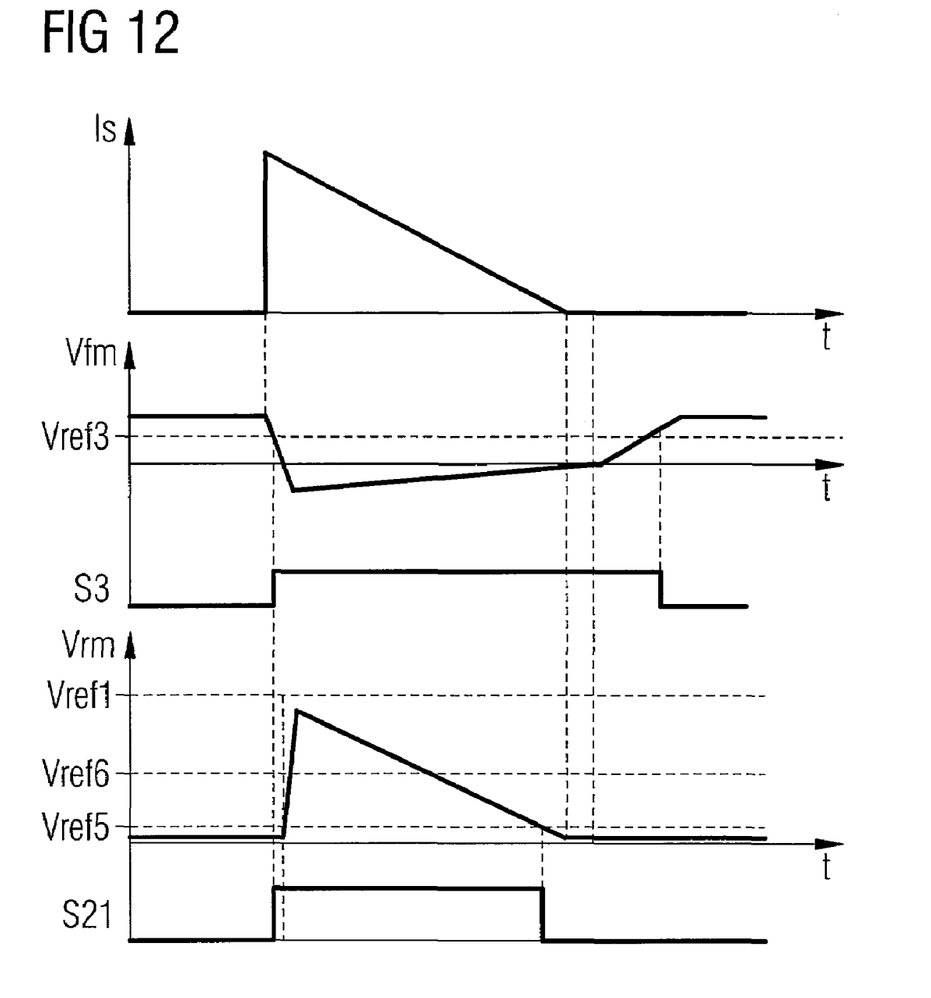
FIG. 12 illustrates a scenario, when a transistor of a synchronous rectifier is switched off too late.

FIGS. 11 and 12 illustrate timing diagrams for switching scenarios of SR MOSFET 21 in which non-optimum switching is performed. In the scenario according to FIG. 11 the first measurement signal Vrm rises above the upper threshold Vref1 indicating that the diode conducts after SR MOSFET 21 has been switched off. This indicates that SR MOSFET 21 has been switched off too early. In this case the conduction losses are increased as compared to the switching scenario that is illustrated in FIG. 8 because the secondary side current flows through the body diode of SR MOSFET 21 instead of the MOS channel of SR MOSFET 21 for a significant longer time period in this switching scenario.

In the switching scenario illustrated in FIG. 12 the first measurement signal Vrm stays below the lower reference value Vref6 after SR MOSFET 21 has been switched off. This indicates that SR MOSFET 21 has been switched off too late. In this case there is the risk that SR MOSFET 21 is still conducting at the time when the SR MOSFET 21 turns from reverse biased operation to forward biased operation. Referring to FIG. 2, SR MOSFET 21 would then (partly) discharge output capacitor 18.

A possible method for adjusting the delay time ΔT in order to obtain optimum switching will be explained in the following. In this regard it should be mentioned that the first measurement signal Vrm is evaluated for adjusting the delay time ΔT during one cycle of operation of SR MOSFET 21, while adjustments made to the delay time will become effective for the next cycle of operation. One cycle of operation includes a period of time in which SR MOSFET 21 is switched on and is subsequently switched off. For explanation purposes it may be assumed that a new cycle of operations starts each time when SR MOSFET 21 is switched on, which is at time t1 in the timing diagrams of FIG. 8.

According to one example for adjusting the delay time ΔT the first measurement signal Vrm is evaluated in a given time window that starts when SR MOSFET 21 is switched off. The delay time ΔT for the next cycle of operation is increased as compared to a current value, if the first measurement signal Vrm rises above the upper threshold value Vref1 during the evaluation time window, and the delay time ΔT for the next cycle of operation is decreased according to the current value if the first measurement signal Vrm stays below the lower threshold Vref6. If the first measurement signal Vrm rises above the lower threshold Vref6 and stays below the upper threshold Vref1 the delay time is not amended, i.e., the delay time that is used for the current cycle of operation is also applied to the next cycle of operation.

According to one example the delay time is increased or decreased in constant steps each time a non-optimum switching operation, i.e., too early switching or too late switching, is detected.

Figure 13:
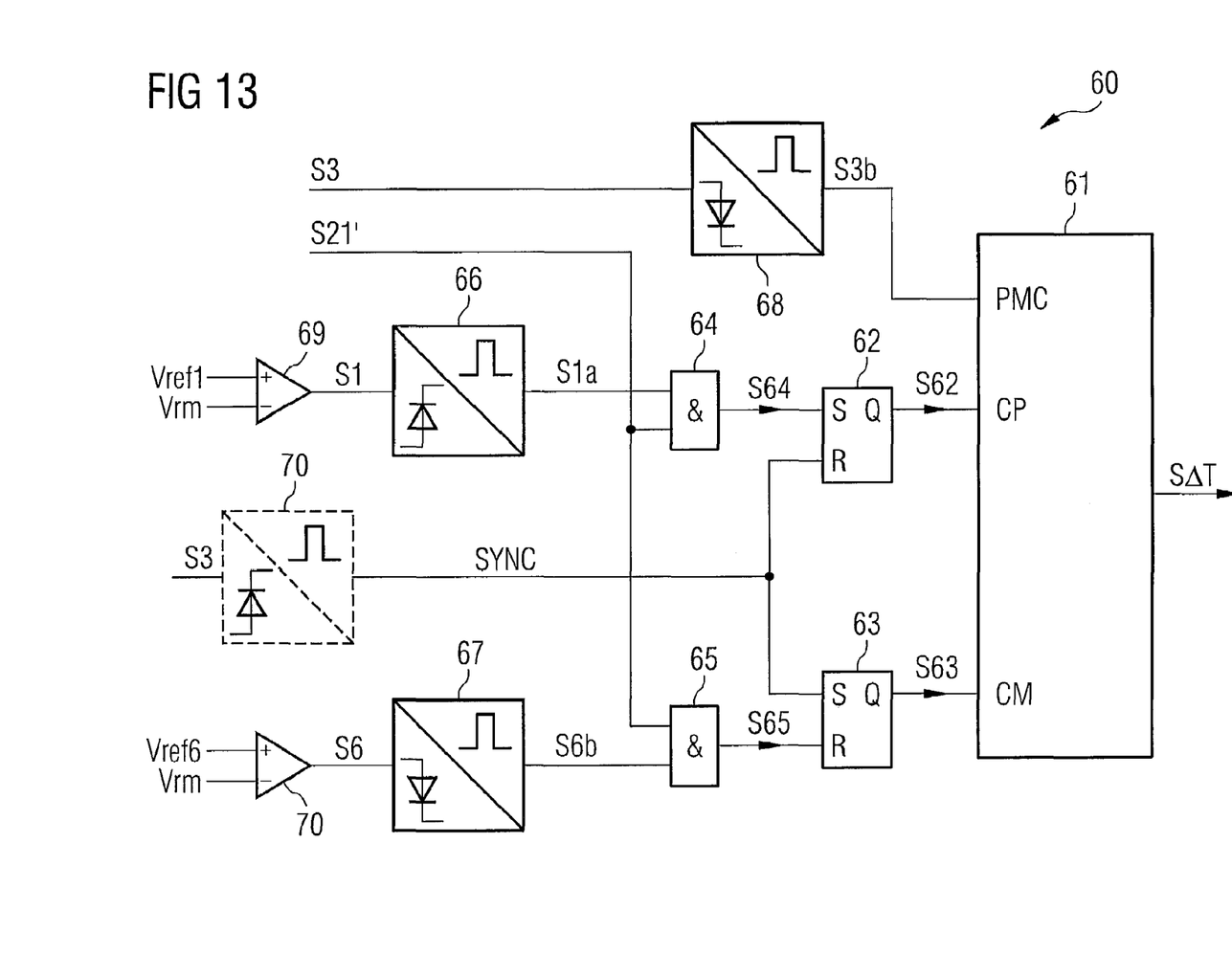
FIG. 13 illustrates an example of a circuit for generating the delay time signal that is received by the timer.

An example of a delay time generation circuit 60 that generates the delay time signal SAT is illustrated in FIG. 13. The delay generation circuit 60 according to the example includes a counter circuit 61 for providing the delay time signal $S_{ΔT}$ as a digital counter value at a output terminal OUT. Counter circuit 61 comprises four input terminals, namely a sample time input PMC, a count-up input CP, and a count-down input CM. Counter circuit 61 is adapted to evaluate signal levels of input signals S62, S63 received at the count-up and count-down terminals CP, CM at a sample time, where the sample time is determined by a sample time signal S3b that is received at sample time input PMC. An internal counter (not shown) of counter circuit 61 is increased, i.e., internal counter is count-up, if count-up signal S62 has a given signal level at sample time. In equivalent manner the counter value is decreased if count-down signal S63 has a given signal level at sample time. For explanation purposes it may be assumed that the given signal level of count-up and count-down signals S62, S63 that cause the counter value to be increased/decreased is a high signal level.

Sample time signal S3b may be generated from signal S3 that, referring to the above explanation, serves to switch SR MOSFET 21 on. In the present example sample time signal S3b indicates a falling edge of signal S3 and is generated from signal S3 using a pulse signal generation circuit 68 that detects falling edges of signal S3 and generates a signal pulse each time such a falling edge is detected. A timing diagram of sample time signal S3b is also illustrated in FIG. 8. In this example a signal pulse of sample time signal S3b occurs after the end of reverse biased operation of SR MOSFET 21, i.e., at a time when SR MOSFET 21 is already forward biased. In the present example the signal pulse of sample time signal S3b occurs at the time when the second measurement signal Vfm rises above on-threshold Vref3.

Delay signal generation circuit 60 further comprises two evaluation circuits. A first evaluation circuit that evaluates if the first measurement signal Vrm rises above the upper threshold Vref1 after SR MOSFET 21 has been switched off, and a second evaluation circuit that evaluates if the first measurement signal Vrm stays below the lower threshold Vref6 after SR MOSFET 21 has been switched off. First evaluation circuit comprises a first comparator 69 for comparing the first measurement signal Vrm to the upper threshold value Vref1 and for providing a first comparator signal S1 that is dependent on this comparison. For explanation purposes it may be assumed that the first comparator signal S1 assumes a high level each time first measurement signal Vrm is higher than the first threshold value Vref1. The second evaluation circuit comprises a second comparator 70 that compares the first measurement signal Vrm to the lower threshold value Vref6, and that provides a second comparator signal that is dependent on this comparison. For purpose of explanation it may be assumed that the second comparator signal S6 assumes a high level each time the first measurement signal Vrm is higher than the second threshold value Vref6.

The first evaluation circuit further includes a pulse generation circuit 66 that receives the first comparator signal S1 and that is adapted to generate a first pulse signal S1a. In the present example first pulse generation element 66 is adapted to generate a signal pulse of first pulse signal S1a each time a rising edge of first comparator signal S1 occurs. Timing diagrams of first comparator signal S1 and first pulse signal S1a are also illustrated in FIG. 8. Second evaluation circuit includes a second pulse generation circuit 67 that receives the second comparator signal S6, and that generates a second pulse signal S6b. In the present example the second pulse generation element 67 is adapted to generate a signal pulse of second pulse signal S6b each time a falling edge of second comparator signal S6 is detected. After SR MOSFET 21 has been switched off a signal pulse of first pulse signal S1a does only occur, if the first measurement signal Vrm rises above the first threshold value Vref1, and a signal pulse of second pulse signal S6b does only occur, if the first measurement signal Vrm has risen above the lower threshold value Vref6.

First evaluation circuit further includes a first logic gate 64, which is an AND gate in the present case, that receives the first pulse signal S1a and that provides an output signal S64 that corresponds to the first pulse signal S1a during time periods in which SR MOSFET 21 is switched off. For this purpose first AND gate 64 receives a further signal S21' which is the inverted control signal, and which may be tapped off at an inverting output Q' of output flip-flop 51 of drive circuit 60 (see FIG. 9). Signal 21' has a high level each time SR MOSFET 21 is switched off. Signal pulses of first pulse signal S1a therefore "pass" the first AND gate 64 only in those time periods in which SR MOSFET 21 is switched off. In an equivalent manner the second evaluation circuit comprises a second AND gate 65 that receives the second pulse signal S6b at a first input, and that receives the inverted control signal S21' at a second input. An output signal S65 of the second AND gate 65 corresponds to the second pulse signal S6b during those time periods in which SR MOSFET 21 is switched off.

First evaluation circuit further includes a first flip-flop 62 that receives the output signal S64 of first AND gate 64 at its set input S, that receives a synchronization signal SYNC at its reset input R, and that provides the count-up signal S62 at its non-inverting output Q. Second evaluation circuit comprises a second flip-flop 63 that receives the synchronization signal SYNC at its set input S, that receives the output signal S65 of second AND gate 65 at its reset input R and that provides the count-down signal S63 at its non-inverting output Q. Synchronization signal SYNC includes a signal pulse that is generated once with each cycle of operation of SR MOSFET 21, and that is generated outside the evaluation time window in which the first measurement signal Vrm is evaluated. Referring to the example shown in FIG. 13 synchronization signal SYNC may be generated from signal S3 that switches SR MOSFET 21 on. A signal pulse of synchronization signal SYNC may be generated with each rising edge of signal S3. In this case synchronization signal SYNC corresponds to signal S3a that has been explained with reference to FIG. 9 and a timing diagram of which is shown in FIG. 8.

In the delay time generation circuit 60 according to FIG. 13 first flip-flop 62 is reset by synchronization signal SYNC before the evaluation time window starts, and flip-flop 63 is set by synchronization signal SYNC after the evaluation time window starts. In this circuit the evaluation time window starts when SR MOSFET 21 is switched off, i.e., when inverted control signal S21' assumes a high signal level. Starting with this time first flip-flop 62 can be set by a signal pulse of first pulse signal S1a, and second flip-flop 63 can be reset by a signal pulse of second pulse signal S6b. In the following the functionality of delay time generation circuit 60 will be explained for three different scenarios: Too early switching, in this case the first measurement signal Vrm rises above the lower and the upper threshold value Vref6, Vref1 after SR MOSFET 21 has been switched off. Too late switching, in this case the first measurement signal Vrm stays below the lower threshold value Vref6 and the upper threshold value Vref1. And optimum switching, in this case the first measurement signal Vrm rises above the lower threshold value Vref6, but stays below the upper threshold value Vref1.

In case of too early switching first flip-flop 62 is set by a signal pulse of first pulse signal S1a, and second flip-flop 63 is reset by a signal pulse of second pulse signal S6b. At sample time, i.e., at the time of a signal pulse of sample time signal S3b, count-up signal has a high signal level, while count-down signal has a low-signal level S63. The counter value of counter circuit 61 is therefore increased in order to extend the delay time data ΔT. In case of too late switching no signal pulses of first and second pulse signals S1a, S6b occur after SR MOSFET 21 has been switched off. Therefore, at sample time first flip-flop 62 is reset, while second flip-flop 63 is set. Therefore, count-up signal S62 has a low signal level, and count-down signal S63 has a high-signal level at sample time. Thus, the counter value of counter circuit 61 is decreased in order to reduce the delay time ΔT. In case of optimum switching no signal pulse occurs in the first pulse signal S1a, and a signal pulse occurs in the second pulse signal S6b. Therefore, at sample time both flip-flops 62, 63 are reset. Thus, count-up signal S62 and count-down signal S63 have low-signal levels at sample time. The counter value of counter circuit 61 is, therefore, not changed, i.e., the delay time ΔT is kept constant.

It should be mentioned that in the circuit of FIG. 13 the counter value is increased or decreased for a given value each time count-up signal S62 or count-down signal S63 has a high signal level at sample time.

In the circuit of FIG. 13 the evaluation time window is determined by inverted control signal S21' and sample time signal S3b. The evaluation time window starts at the time when SR MOSFET 21 is switched off, i.e., when inverted control signal S21' assumes a high-signal level, and the evaluation time window ends, if a signal pulse of sample time signal S3b occurs.

In the example as explained before the second measurement signal Vfm is used for determining those times when SR MOSFET 21 is to be switched. For this purpose second measurement signal Vfm is compared to on-threshold Vref. Instead of evaluating the second measurement signal for determining switch-on times of SR MOSFET a current through diode 47 of measurement circuit 40 may be evaluated as well. A current through diode 47 flows each time SR MOSFET 21 is forward biased and the forward voltage is higher the conduction voltage of diode 47. Switch-on times of SR MOSFET may be determined by comparing the diode current to a threshold, where SR MOSFET 21 is switched on each time the diode current falls below a given threshold.

The current through diode 47 may also be determined in order to detect times when SR MOSFET changes from reversed to forward biased state. Each time a current starts to flow through diode 47 such a change has occurred.

For measuring the current through diode 47 a voltage drop across optional resistor 49 may be used. Alternatively a current mirror circuit (not shown) may be used for measuring the current through diode 47, where diode 47 itself may be part of the current mirror circuit.

Additionally, by evaluating the current through the diode 47 the switching times of the primary switch (16 in FIG. 2) can be detected because every switching of the primary switch 16 causes a voltage change at the secondary side and also the current through the diode 47.

So far, the operating principle of the adaptive time control has been illustrated by digital means. The technical implementation of this concept should not be limited to the mentioned circuit and technologies.

Additionally, in all of the figures above, linear time behavior of the secondary side current is taken for the illustration of operating principle of the adaptive time control. However, this is not a condition for this concept. This concept can also be used for other shapes of the secondary side current, such as sinusoidal waveform from a resonant converter.

What is claimed is:

1. A method for operating a transistor as a rectifier element, wherein the transistor can assume one of a forward biased or a reverse biased state, and wherein the transistor is controlled using a control signal that can assume a switch-on level and a switch-off level, the method comprising:
generating a switch-on level of the control signal prior to the transistor entering the reverse biased state, or after the transistor has entered the reverse biased state;
in the reverse biased state, measuring a reverse biasing voltage of the transistor to provide a first measurement signal, and comparing the reverse biasing voltage to a first reference value, and generating a switch-off level of the control signal after a delay period after the reverse biasing voltage has reached the first reference value; and
after the reverse biasing voltage has reached the first reference value, generating the delay period for a next cycle of operation depending on values of the first measurement signal occurring after the switch-off level has been generated.

2. The method of claim 1, wherein generating the delay period for the next cycle of operation comprises adapting the delay period of the first cycle of operation.

3. The method of claim 2, wherein adapting the delay period comprises:
comparing the reverse biasing voltage to a second and a third reference value, with the second reference value being smaller than the third reference value; and
extending the delay period if the reverse biasing voltage rises above the third reference value, and shortening the delay period if the reverse biasing voltage rises stays below the second reference value.

4. The method of claim 3, wherein the delay period is kept unchanged if the reverse biasing voltage rises above the second reference value but stays below the third reference value.

5. The method of claim 1, wherein generating the switch-on level comprises:
comparing a forward biasing voltage of the transistor to a fourth reference value; and
generating the switch-on level, if the forward biasing voltage falls below the fourth reference value.

6. A circuit arrangement comprising:
a transistor that has a control terminal for receiving a control signal, and first and second load terminals, and that can assume one of a forward biased and a reverse biased state, and
a control circuit:
that is adapted to generate a switch-on level of the control signal prior to the transistor entering the reverse biased state, or after the transistor has entered the reverse biased state,
that is adapted, in the reverse biased state, to measure a reverse biasing voltage of the transistor,
that is adapted to compare the reverse biasing voltage to a first reference value, and to generate a switch-off level of the control signal after a delay period after the reverse biasing voltage has reached the first reference value, and
that is adapted, after the reverse biasing voltage has reached the first reference value, to generate the delay period for a next cycle of operation depending on values of a first measurement signal occurring after the switch-off level has been generated.

7. The circuit arrangement of claim 6, wherein the control circuit comprises a measurement circuit that comprises first measurement arrangement for providing the first measurement signal.

8. The circuit arrangement of claim 7, wherein the first measurement arrangement comprises an inverting amplifier that has an inverting input coupled to the first load terminal of the transistor, and that has an non-inverting input coupled to the second load terminal of the transistor.

9. The circuit arrangement of claim 8, wherein the measurement circuit comprises a second measurement arrangement for providing a second measurement signal that is indicative of a forward biased voltage of the transistor.

10. The circuit arrangement of claim 9, wherein the second measurement arrangement comprises a diode that is connected between the first and second load terminals of the transistor.

11. The circuit arrangement of claim 10, wherein a resistor is connected in series to the diode.

12. The circuit arrangement of claim 7, wherein an anti-saturation circuit is coupled to one of the inputs of an inverting amplifier.

* * * * *